US009580042B2

(12) United States Patent
Patalak et al.

(10) Patent No.: US 9,580,042 B2
(45) Date of Patent: Feb. 28, 2017

(54) STRAIN GAGE LOAD CELL ANCHOR

(71) Applicant: NATIONAL ASSOCIATION FOR STOCK CAR AUTO RACING, INC., Daytona Beach, FL (US)

(72) Inventors: John Peter Patalak, Concord, NC (US); Thomas Gideon, Concord, NC (US); David K. Emerson, Littleton, MA (US); George Low, Littleton, MA (US)

(73) Assignee: National Association for Stock Car Auto Racing, Inc., Daytona Beach, FL (US)

( * ) Notice: Subject to any disclaimer, the term of this patent is extended or adjusted under 35 U.S.C. 154(b) by 104 days.

(21) Appl. No.: 14/327,150

(22) Filed: Jul. 9, 2014

(65) Prior Publication Data
US 2016/0009249 A1    Jan. 14, 2016

(51) Int. Cl.
*B60R 22/22*    (2006.01)
*B60R 21/055*   (2006.01)
*G01L 1/22*     (2006.01)
*B60R 22/18*    (2006.01)
*B60R 21/015*   (2006.01)
*B60R 22/48*    (2006.01)

(52) U.S. Cl.
CPC .......... *B60R 22/22* (2013.01); *B60R 21/0152* (2014.10); *B60R 21/0155* (2014.10); *B60R 21/055* (2013.01); *B60R 22/18* (2013.01); *G01L 1/22* (2013.01); *G01L 1/2281* (2013.01); *B60R 2022/485* (2013.01); *B60R 2022/4841* (2013.01)

(58) Field of Classification Search
CPC ............ B60R 2022/4841; B60R 22/22; B60R 2022/485; B60R 21/055; G01L 1/2281
See application file for complete search history.

(56) References Cited

U.S. PATENT DOCUMENTS 4,659,108 A *  4/1987  Sack ....................... B60R 22/44
                                                      180/268
6,081,759 A *  6/2000  Husby ................. B60R 22/1952
                                                      280/801.1
6,301,977 B1 * 10/2001 Stojanovski ............ G01L 5/103
                                                      73/862.393

(Continued)

FOREIGN PATENT DOCUMENTS

EP        1 475 622 A1    11/2004
WO    WO 2004/002784 A1    1/2004

OTHER PUBLICATIONS

International Search Report and Written Opinion for corresponding International Application No. PCT/IB2015/054436, mailed Sep. 9, 2015.

*Primary Examiner* — James English
(74) *Attorney, Agent, or Firm* — Alston & Bird LLP

(57) ABSTRACT

An apparatus, method of manufacturing, and method of using a strain gage load cell anchor are provided that include a safety belt anchor for connecting a safety belt to a vehicle. The safety belt anchor may have a first anchor opening that connects the safety belt anchor to a safety belt, and the anchor may have a second anchor opening that connects the safety belt anchor to a vehicle. One or more strain gages may be provided on the safety belt anchor to measure a force applied to the safety belt anchor, such that the safety belt anchor operates as a strain gage load cell anchor.

28 Claims, 10 Drawing Sheets

(56) References Cited

U.S. PATENT DOCUMENTS

| | | | | |
|---|---|---|---|---|
| 6,634,235 B2* | 10/2003 | Maeda | ............... | G01L 1/2206 |
| | | | | 177/211 |
| 6,647,811 B2* | 11/2003 | Blakesley | ............... | B60R 22/18 |
| | | | | 73/862.391 |
| 7,021,162 B2* | 4/2006 | Ante | ............... | G01L 1/14 |
| | | | | 73/161 |
| 7,047,825 B2* | 5/2006 | Curtis | ............... | B60N 2/002 |
| | | | | 73/862.391 |
| 7,347,108 B2* | 3/2008 | Kaijala | ............... | B60R 21/0155 |
| | | | | 73/862.391 |
| 7,487,687 B2* | 2/2009 | Sumi | ............... | B60N 2/002 |
| | | | | 73/862.391 |
| 8,381,367 B2* | 2/2013 | Metzger | ............... | B60R 22/18 |
| | | | | 24/182 |
| 2001/0054323 A1* | 12/2001 | Faigle | ............... | B60N 2/002 |
| | | | | 73/862.391 |
| 2002/0059840 A1* | 5/2002 | Houston | ............... | G01L 1/2206 |
| | | | | 73/862.474 |
| 2003/0024327 A1* | 2/2003 | Garver | ............... | B60R 22/18 |
| | | | | 73/862.393 |
| 2005/0001418 A1* | 1/2005 | Kanbe | ............... | B60R 22/18 |
| | | | | 280/806 |
| 2005/0066748 A1* | 3/2005 | Senoo | ............... | G01G 19/4142 |
| | | | | 73/862.045 |
| 2006/0124377 A1* | 6/2006 | Lichtinger | ............... | B60N 2/002 |
| | | | | 180/273 |
| 2007/0240525 A1* | 10/2007 | Kaijala | ............... | B60R 22/18 |
| | | | | 73/862.391 |

\* cited by examiner

STRAIN GAGE LOAD CELL ANCHOR

BACKGROUND

The present invention is directed to improved apparatus, method of manufacturing, and method of using a load cell anchor. In particular, the present invention relates to a strain gage load cell anchor capable of measuring an applied force.

Safety harnesses are used in a variety of applications to secure passengers or cargo to various supports, platforms, seats, or assemblies. Vehicles, such as airplanes, boats, or automobiles may use harnesses to hold either persons or objects securely to the vehicle and to protect the persons or objects in the event of a crash. These safety harnesses can be made of one or more individual belts that may be connected to the vehicle by one or more anchors. The anchors may include simple loops in the safety belts or more sophisticated attachment devices, and the anchors may be designed to connect to the vehicle either directly or indirectly via a seat, frame, or body of the vehicle.

Typically, force sensors, such as load cells, are used during the testing of a vehicle to assist with designing and improving the components of the vehicle by measuring the loads on the vehicle and on the passengers. In order to test vehicle safety harnesses, large load cells are attached to a test platform and connected directly or indirectly to the safety belt anchors. The load cells then return the force applied to the load cell by the safety belts and the vehicles during an experimental crash scenario.

Currently, safety harnesses are tested almost exclusively on test beds in a laboratory environment due to the size and weight constraints of current load cells. Many vehicle harnesses are anchored in tight locations with little access or surrounding space. Some safety belts connect to the vehicle via the vehicle seat, which has little room to support a separate load cell. Moreover, typical high-performance vehicles use harnesses with six to nine attachment points, which multiplies the weight and sizing problems of typical load cells when more than one source of data is required. In some instances, current safety harness test systems must elongate and/or reposition the safety belts from their in-use position in order to connect with the load cells. This may cause inaccurate measurements of the forces on the safety belts and safety belt anchors.

Through applied effort, ingenuity, and innovation, many of these identified problems have been solved by developing solutions that are included in embodiments of the present invention, many examples of which are described in detail herein.

SUMMARY OF THE INVENTION

Load cells may calculate the force applied to the load cell by any attached device or connector. The load cells provide critical information to a user about the forces acting on both the load cell and the surrounding system. This information may be used to improve the design of the various components of the system, or it may be used to monitor the physical condition of passengers and/or cargo connected either directly or indirectly to the load cell. Accordingly, embodiments of the present invention described herein relate to an improved load cell for measuring the force and/or strain applied to a harness and/or anchor.

In some embodiments, an strain gage load cell anchor for a safety belt of a vehicle may include a safety belt anchor and may include one or more strain gages attached to the safety belt anchor. The safety belt anchor may include a first anchor opening configured to connect the safety belt anchor to a safety belt. The safety belt anchor may further include a second anchor opening configured to connect the safety belt anchor to a vehicle such that the safety belt anchor is configured to connect the safety belt to the vehicle. The one or more strain gages may be configured to measure a force applied to the safety belt anchor by the safety belt.

In some embodiments, the safety belt anchor may elastically deform at least between the first and second anchor openings in response to the force applied to the safety belt anchor. The one or more strain gages may elastically deform when the safety belt anchor elastically deforms. In some embodiments, a resistance of each strain gage may be configured to change when elastically deformed, such that the one or more strain gages may be configured to measure the force on the safety belt anchor via the change in resistance of each strain gage.

In some embodiments, at least two of the strain gages may be located on the same side of the first anchor opening as the second anchor opening.

The safety belt anchor may further define a first axis spanning between a center of the first anchor opening and a center of the second anchor opening. In some embodiments, at least two of the strain gages may be located between the first and second anchor openings with respect to the first axis. The safety belt anchor may further define a first axis spanning between a center of the first anchor opening and a center of the second anchor opening. In some embodiments, the safety belt anchor may further define an axis of the second opening that is orthogonal to the first axis such that the safety belt anchor is configured to pivot about the axis of the second opening with respect to the vehicle to maintain a direction of the force within a plane defined by the first axis and the axis of the second opening.

In some embodiments, at least one of the one or more strain gages may be attached to an edge of the safety belt anchor. The edge of the safety belt anchor may define a circumferential direction and a transverse direction substantially perpendicular to the circumferential direction. The edge may be flat in the transverse direction at a location of at least one of the one or more strain gages. Some embodiments of the strain gage load cell anchor include at least one recess in the edge at a location of at least one of the one or more strain gages, such that the edge is concave in the circumferential direction at the location of the at least one of the one or more strain gages. In some embodiments, the one or more strain gages may be attached to an edge of the safety belt anchor.

Some embodiments of the strain gage load cell anchor may include at least one channel defined in an edge of the safety belt anchor. The edge may define a circumferential direction and a transverse direction substantially perpendicular to the circumferential direction. A transverse width of the at least one channel may be less than a transverse width of the safety belt anchor, and at least one of the one or more strain gages may be disposed within the at least one channel.

In some embodiments, the safety belt anchor may define a first face and a second face. The first face may be substantially parallel to the second face, and at least one of the one or more strain gages may be attached to one of the first face or the second face.

Some embodiments may include a strain circuitry disposed on the safety belt anchor and connected to each of the strain gages such that the strain circuitry may be configured to receive strain data from each of the strain gages. In some embodiments, the strain circuitry may be recessed into one of a first face or a second face defined by the safety belt anchor. The strain circuitry may be connected to each of the strain gages by one or more respective wires, and at least one of the wires may be at least partially disposed in a wire channel defined in an edge of the safety belt anchor. In some embodiments, the strain circuitry may include a temperature compensator configured to isolate strain data from temperature fluctuations within a predefined range. The strain circuitry may include a strain processing circuitry configured to determine one of a force or strain on the safety belt anchor.

In some other embodiments of the present invention, a method of manufacturing a safety belt strain gage load cell may be provided. The method may include providing a safety belt anchor having a first anchor opening and a second anchor opening and may include attaching one or more strain gages to the safety belt anchor such that the one or more strain gages may be configured to measure the force on the safety belt anchor. In some embodiments, the first anchor opening may be configured to connect the safety belt anchor to a safety belt. The second anchor opening may be configured to connect the safety belt anchor to a vehicle such that the safety belt anchor may be configured to connect the safety belt to the vehicle.

In some embodiments, the safety belt anchor may further define a first axis spanning between a center of the first anchor opening and a center of the second anchor opening. The safety belt anchor may define an axis of the second opening that is orthogonal to the first axis such that the safety belt anchor is configured to pivot about the axis of the second opening with respect to the vehicle to maintain a direction of the force within a plane defined by the first axis and the axis of the second opening. In some embodiments, attaching the one or more strain gages may include attaching the one or more strain gages to an edge of the safety belt anchor.

Some embodiments of the method may include flattening the edge of the safety belt anchor at a location of attachment for at least one of the one or more strain gages.

Some embodiments may include forming at least one recess in the edge adjacent at least one of the one or more strain gages. The edge of the safety belt anchor may define a circumferential direction and a transverse direction substantially perpendicular to the transverse direction, and the edge may be concave in the circumferential direction adjacent the at least one of the one or more strain gages.

Some embodiments of the method may include attaching a strain circuitry to the safety belt anchor and may include connecting the strain circuitry to each of the strain gages such that the strain circuitry may be configured to receive strain data from each of the strain gages.

In yet another embodiment of the present invention, a method of measuring a force of a safety belt on a load cell anchor may be provided. The load cell anchor may include a safety belt anchor having a first anchor opening and a second anchor opening, wherein a safety belt may be connected to the first anchor opening, wherein the second anchor opening may be connected to a vehicle such that the safety belt may be connected to the vehicle via the safety belt anchor, and wherein the load cell anchor may further include one or more strain gages attached to the safety belt anchor.

Some embodiments of the method may include applying a force to the safety belt anchor by the safety belt and may include measuring the force applied to the safety belt anchor with the one or more strain gages attached to the safety belt anchor. Applying the force to the safety belt anchor may cause the safety belt anchor to elastically deform such that the one or more strain gages also elastically deform, and measuring the force applied to the safety belt anchor may include measuring the change in voltage in the one or more strain gages caused by the elastic deformation of the one or more strain gages.

In some embodiments, measuring the force applied to the safety belt anchor may include receiving strain data from the one or more strain gages with a strain circuitry. Receiving strain data from the one or more strain gages with the strain circuitry may include applying a temperature compensation to the strain data. The strain circuitry may include a strain processing circuitry, and measuring the force applied to the safety belt anchor may include determining one of a force or strain on the safety belt anchor using the strain processing circuitry.

DETAILED DESCRIPTION

The present invention will now be described more fully hereinafter with reference to the accompanying drawings, in which some, but not all embodiments of the present invention are shown. Indeed, the present invention may be embodied in many different forms and should not be construed as limited to the embodiments set forth herein; rather, these embodiments are provided so that this disclosure will satisfy applicable legal requirements. As used herein, terms such as "front," "back," "left," "right," "top," "bottom," "upper," or "lower" are included for exemplary purposes to show only a relative location of certain features and should not be construed to limit the scope of the invention to a single direction. Like numbers refer to like elements throughout.

As used herein, the term "vehicle" may include, but is not limited to, automobiles such as passenger cars, sports cars, or open- or closed-wheel racecars; planes; watercraft; and/or various models and test beds for such machines.

In addition to the above-mentioned testing scenarios, it would be beneficial for vehicles, and particularly high performance vehicles, to be able to monitor the force applied to safety harness systems and anchors during normal operation of the vehicle. For example, racecar drivers routinely experience between fifty and seventy times the force of gravity during a crash, meaning that extensive and accurate monitoring of the resultant forces is crucial. Real-time, in-use monitoring of the forces a passenger experiences during a crash may improve treatment of the passenger post-crash by showing the actual forces exerted on the body as well as improving the design of the harnesses, anchors, seats, and vehicles by returning accurate, real-world data on crashes.

Figure 1:
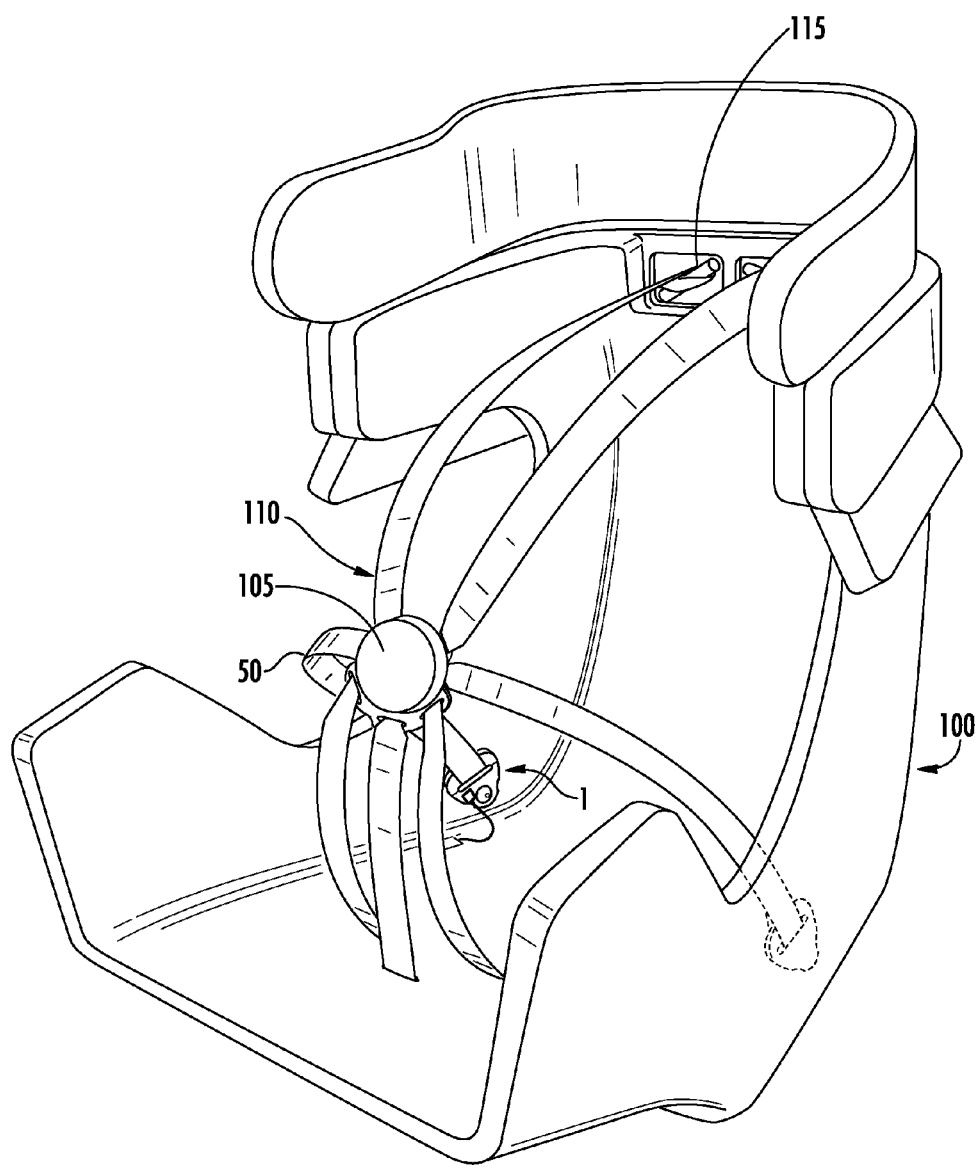
FIG. 1 shows a perspective view of a vehicle seat having a safety harness in accordance with an embodiment of the present invention.

The present invention provides a strong, reliable strain gage load cell anchor that may be substituted for existing safety belt anchors without requiring a separate force sensor. With reference to FIG. 1, a vehicle seat is shown in accordance with one embodiment of the present invention. The vehicle seat may hold a passenger in a vehicle with a safety harness that includes one or more individual safety belts. The harness may have between two and nine points of contact within the vehicle to secure the passenger, meaning each harness has between two and nine attachment points with the vehicle and/or vehicle seat. In one embodiment, vehicle safety harnesses may be equipped with at least three points of contact. In a second embodiment, vehicle safety harnesses may be equipped with at least four points of contact. In another embodiment, vehicle safety harnesses may be equipped with at least five points of contact. In yet another embodiment, vehicle safety harnesses may be equipped with six to nine points of contact.

In some embodiments the safety belts may be attached to the frame of the vehicle such that the majority of the force applied to the harness by a passenger during a crash is transferred directly into the vehicle. Some embodiments may attach one or more of the safety belts to a roll cage or floor panel. In some other embodiments, one or more of the safety belts may be attached to the vehicle seat. In these embodiments, the vehicle seat may be attached to the vehicle and may transfer the force of the harness into the vehicle. By attaching the harness directly to the seat, the vehicle seat may be allowed to shift within the vehicle, for example in the case of a driver-side impact, while holding the passenger firmly within the vehicle seat.

Figure 2:
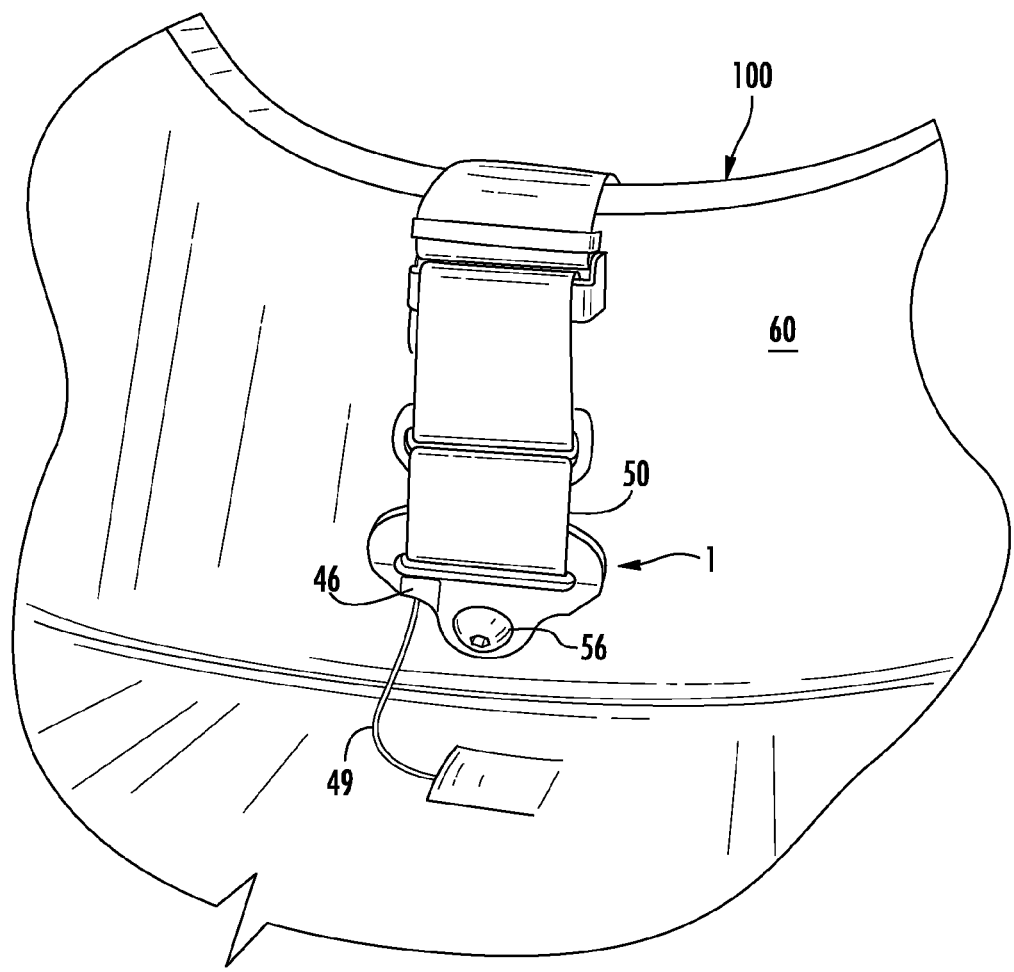
FIG. 2 shows a close-up view of a strain gage load cell anchor attached to a vehicle seat in accordance with an embodiment of the present invention.

FIG. 2 shows a zoomed in view of a strain gage load cell anchor installed on a vehicle seat in accordance with one embodiment of the present invention. The load cell anchor in the example embodiment of FIG. 2 is connected to a lap belt of a harness assembly and anchored to the inner-side of a vehicle seat. The load cell anchor may alternatively be installed on the outside of the vehicle seat or on the frame of the vehicle, as discussed herein. In some embodiments, the load cell anchor may be disposed on a side or back of a vehicle seat with the safety belt routed around or through the vehicle seat. The strain gage load cell anchor, as discussed herein, may similarly be applied to any anchor point or junction of any harness assembly that would benefit from measuring a force applied to the anchor point or junction. For example, any of the shoulder, lap, crotch, or other anchor points of a racing harness may be fitted with embodiments of the strain gage load cell anchor discussed herein.

In some embodiments the strain gage load cell anchor includes a safety belt anchor, which may substantially match the shape of a standard safety belt anchor for the particular vehicle seat being used. In some embodiments, the strain gage load cell anchor techniques discussed herein may be retrofitted onto an existing safety belt anchor. In some alternative embodiments, the strain gage load cell anchor may be built in substantially the same form factor as an existing safety belt anchor or may be built as a distinctly shaped load cell anchor.

Figure 3:
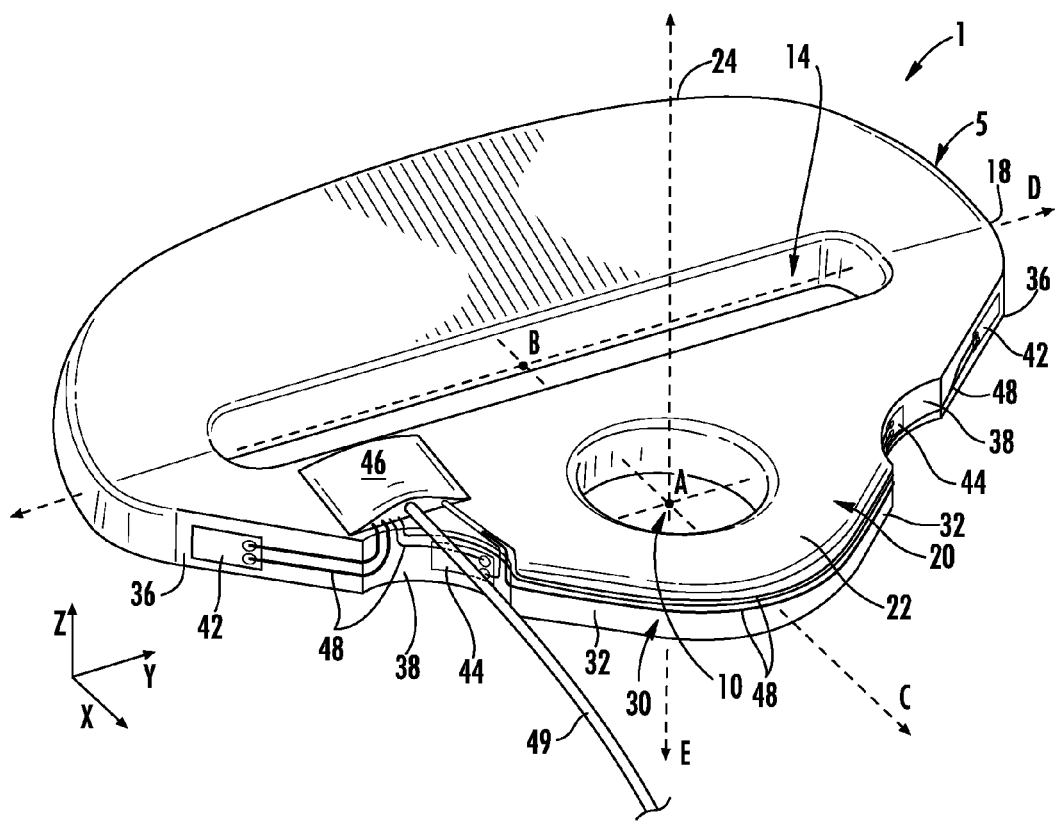
FIG. 3 shows a perspective view of a strain gage load cell anchor in accordance with an embodiment of the present invention.

As shown in FIG. 2, in some embodiments, the safety belt anchor may be substantially triangular in shape with an elongated first anchor opening that receives the safety belt and a second anchor opening that attaches the safety belt anchor to the vehicle. In some embodiments, as shown in FIG. 2, a bolt or other fastening member is fitted into the second anchor opening to attach the anchor to the vehicle. The safety belt anchor may be shaped to allow the safety belt to not catch on the vehicle when the anchor is attached. In some embodiments, as shown in FIG. 3, the safety belt anchor 5 may have a bend 18 near or at the first anchor opening 14 such that a first end 24 of the safety belt anchor is disposed at approximately eighteen degrees relative to a second end 22 of the surface 20 of the anchor. Although, the angle of the bend 18 may be any desired dimension to ensure a strong connection between the safety belt, vehicle, and anchor. When the strain gage load cell anchor 1 is attached to a vehicle, the second end 22 may be flush with the surface of the vehicle, while the first end 24 is angled off of the surface to allow the safety belt to pass smoothly through the first anchor opening 14. This angle may allow the safety belt to pass around the first end 24 without being pinched between the safety belt anchor 5 and the vehicle. This may prevent wear on the safety belt when the belt slides against a surface of the vehicle.

The safety belt anchor may also be designed to pivot about the second anchor opening to allow the force to be applied in line with the fastening member and avoid applying excessive torque to the safety belt anchor or fastening member. For example, the safety belt anchor may be configured to pivot about the axis of the secondary anchor opening E, as shown in FIG. 3, so that the direction of the force between the safety belt and the vehicle lies within the plane formed by a first axis C, connecting the center points A, B of the first and second anchor openings, and the axis of the secondary anchor opening E.

As explained in further detail below, one or more strain gages 42, 44 may be attached to the safety belt anchor 5 to measure the force in the anchor in an integrated assembly, thereby obviating the need for separate load cells and anchors in the vehicle in some embodiments. In some embodiments, the strain gages 42, 44 may be attached by an epoxy glue or other adhesive which allows the strain gages to be securely attached to the safety belt anchor 5. The strain gages 42, 44 measure the force by measuring the elastic deformation of the safety belt anchor 5 as the force is applied. The safety belt anchor 5 may elastically deform at least between the first and second anchor openings in response to the opposing forces between the safety belt and the vehicle. In some embodiments, the strain gages include multiple lines of parallel wires in a sheet that longitudinally, elastically deforms as the underlying surface of the safety belt anchor 5 elastically deforms. As the strain gages elastically deform, their internal resistance changes allowing the strain on the safety belt anchor to be determined. For example, if the parallel wires of the strain gages axially elongate, the diameter of each of the wires must narrow, thereby increasing the resistance of the strain gage. Likewise, if the parallel wires were compressed, the strain gage may decrease in resistance due to the increased diameter of the wires. Using the strain on the safety belt anchor and the known properties of the safety belt anchor, the load cell anchor may determine the force on the safety belt anchor (e.g. by calibrating the strain gages), as discussed in further detail herein. In some embodiments, the strain gages may be firmly fixed to the surface of the safety belt anchor with an adhesive or epoxy. In some embodiments, a traditional safety belt anchor may be retrofitted with strain gages in order to ensure that the final strain gage load cell anchor is substantially the same size and configuration as the original anchor.

With reference to FIG. 3, a strain gage load cell anchor 1 is shown in accordance with some embodiments of the present invention. As discussed herein, one or more strain gages 42, 44 may be attached to the safety belt anchor 5 in order to measure the elastic deformation of the safety belt anchor to determine the force applied to the anchor by the vehicle and the safety belt. In some embodiments, the strain gages 42, 44 may be calibrated relative to their specific load cell anchor to return a force as related to a change in resistance and/or change in voltage of the gages. In some environments, the characteristics of the anchor, such as its dimensions and/or Young's modulus, may allow a force to be determined from a measured strain on the strain gage load cell anchor.

Figure 4:
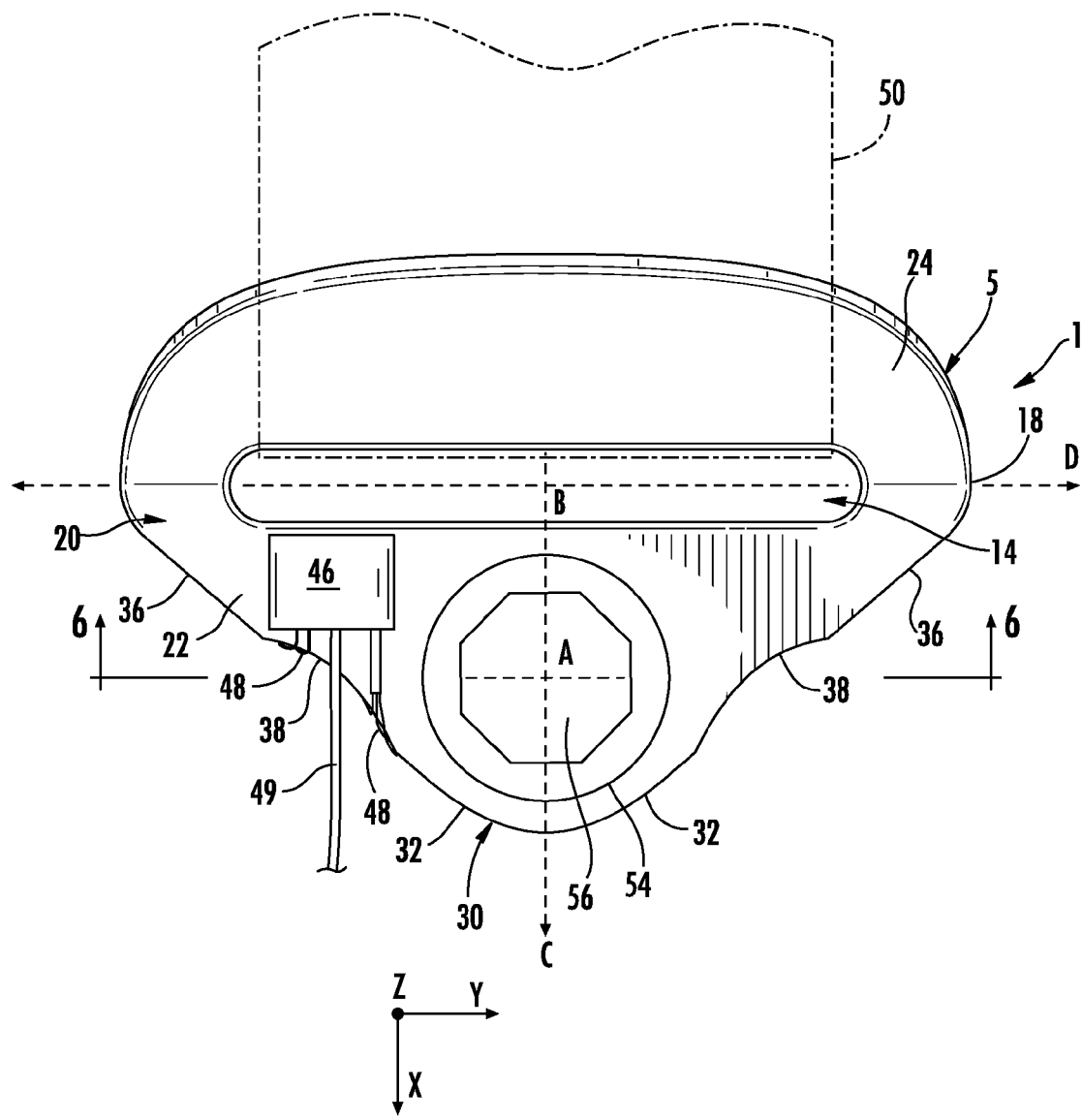
FIG. 4 shows a top-down view of a strain gage load cell anchor having a safety belt and a fastening member in accordance with an embodiment of the present invention.
Figure 5:
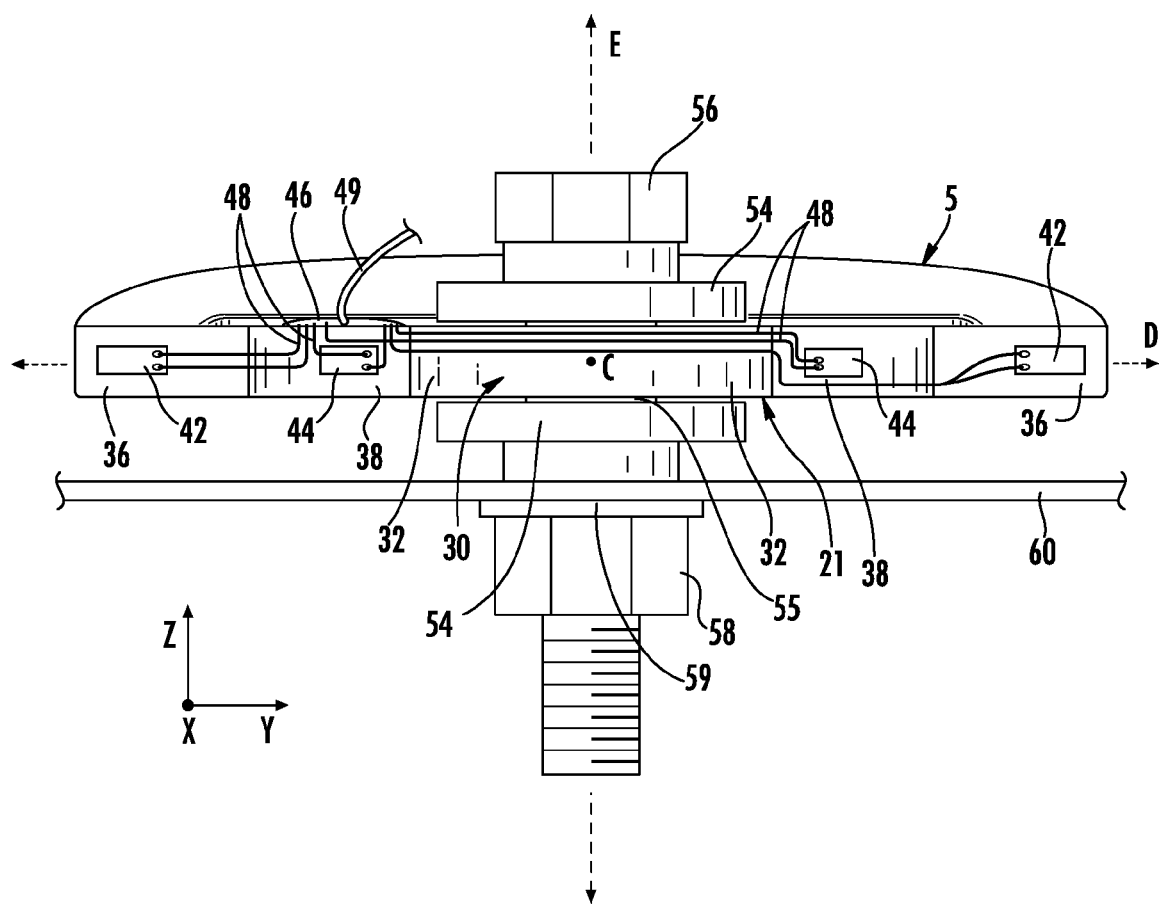
FIG. 5 shows a front view of a strain gage load cell anchor attached to a vehicle in accordance with an embodiment of the present invention.

In some embodiments, the strain gages 42, 44 may be attached to the edges 30 of the safety belt anchor 5, such that each gage is configured to measure the elastic deformation of the portion of the edge beneath it. The edges 30 of the safety belt anchor 5 may be flattened to allow a flat connection between the strain gages 42, 44 and the safety belt anchor. For example, as shown in FIGS. 3-5, the portion of the edge 36 beneath a pair of the strain gages 42 is flattened, while other portions of the edge 32, 34 may be rounded and/or chamfered.

In some embodiments, the strain gages 42, 44 may be used to measure the circumferential, elastic deformation of the safety belt anchor 5, while minimizing the transverse, elastic deformation of the strain gages. Some strain gages 42, 44 may be designed to measure strain along the axis of their parallel wires in order to measure a linear, elastic deformation within the sheet of the strain gage. In some instances, transverse, elastic deformation of the strain gages 42, 44 perpendicular to the axis of the parallel wires may also affect the resistance and/or voltage and, thereby, the strain measurement of the gage. Some embodiments of the present invention flatten at least the transverse direction of the portions of the edges 36, 38 at the locations of attachment for the respective strain gages 42, 44. For example, with reference to FIGS. 3-5, one or more strain gages 44 of the present invention may be disposed within a recess 38 in the edge 30 of the safety belt anchor 5. In these portions, the circumferential dimension of the recess (e.g., the direction corresponding to the circumference of the safety belt anchor 5 along the edges 30) is concave in order to amplify the elastic deformation of the surface of the edge, but the transverse dimension of the recess (e.g. perpendicular to the circumferential dimension) is flat. The concave surface 38 of the recess may elastically deform more in response to a force on the seatbelt anchor than a circumferentially flat section because of the increased length in the edge 30 allowed by the curve of the recess. This allows the elastic deformation of the strain gage 44 in the circumferential direction, along the parallel wires of the strain gage, to be increased while keeping the transverse dimension of the strain gage flat to reduce error in the readings. In some alternative embodiments, the edges 30 may be contoured to any shape or configuration that increases the accuracy of the force readings or makes the strain gage load cell anchor more reliable.

The edges 30 of the safety belt anchor 5 may be either completely flat or at least flat in the transverse dimension, as discussed above. In some embodiments, this flat portion 36, 38 may be added to the safety belt anchor 5 after forging by cutting and/or grinding the edges 30 to the desired flatness. In some alternative embodiments, the safety belt anchor may be forged with portions of the edges 36, 38 having a desired flatness, or may be forged substantially flat and subsequently machined into a smoother surface. Similarly, the recessed portions 38 of the edges may be formed after forging, such as by machining the concave portion into the edges, or alternatively may be forged in substantially the desired shape, as well as combinations thereof. In some embodiments, portions of the edges 32, 34 that do not have strain gages 42, 44 may be chamfered, rounded, or otherwise configured similarly to traditional safety belt anchors.

In some alternative embodiments, the strain gages 42, 44 may be positioned on the upper 20 and/or lower surface 21 of the safety belt anchor 5 and, in some embodiments, may be recessed into the surface.

In some embodiments, multiple strain gages 42, 44 may be positioned in various locations on the surfaces 20, 21 and/or edges 30 of the safety belt anchor. In some embodiments, the strain gages 42, 44 may be symmetrical about the center axis C, as shown in FIGS. 3-5, such that the strain gages align in respective pairs. For example, in the embodiment shown in FIG. 3, the first pair of strain gages 42 are reflectively symmetric to one another about the center axis C. Similarly, a second pair of strain gages 44 may also be provided, which may additionally or alternatively be reflectively symmetric to one another. In some embodiments, the recessed portions 38 of the edges 30 may also be provided, which may be reflectively symmetric about the center axis C. Each of the strain gages 42, 44 may be disposed in recesses 38, either individually or with other strain gages. In some embodiments, as shown in FIGS. 3-5, some portion of the strain gages 44 may be disposed within the recesses 38 and some portion of the strain gages 42 may be disposed on a circumferentially flat edge 36 of the safety belt anchor 5. Some alternative embodiments may dispose each of the strain gages 42, 44 on circumferentially flat edges 36 of the anchor 5.

In some embodiments the strain gages 42, 44 may be disposed on the second end 22 of the safety belt anchor 5 on the same side of the first anchor opening 14 as the second anchor opening 10. The strain gages 42, 44 may be located between the first anchor opening 14 and the second anchor opening 10 relative to the axis C spanning the centers A, B of the first and second anchor openings 10, 14. The strain gages 42, 44 may be directly between the two openings, on the axis C, or may be between the two openings relative to the axis C and offset from the axis, such as shown in FIGS. 3-5. In some embodiments, one or more of the strain gages 42, 44 may be between the first anchor opening 14 and the second anchor opening 10, while the remaining strain gages 42, 44 may be positioned behind the second anchor opening 10 relative to the first anchor opening 14 with respect to the axis C.

In some embodiments, the strain gages 42, 44 may be disposed within channels in the edges 30 of the safety belt anchor 5. The channels may have a similar crescent or concave shape to the recesses 38, but may only be cut into a portion of the transverse width of the anchor 5 so that the top surface and/or bottom surface of the anchor 5 appears to have a straight edge. In this embodiment, the benefits of a recessed edge 38 may be realized by having a longer, concave surface on which to attach the strain gages 42, 44, but with one or both of the top and bottom surfaces of the channels being protected from accidental contact. The channels may also require less material to be removed from a safety belt anchor 5 during manufacturing.

Each of the strain gages 42, 44 may be connected to a strain circuitry 46. In some embodiments the strain circuitry 46 may receive strain data from each of the strain gages 42, 44 corresponding to signals representing the amount strain detected at the location of attachment for each strain gage. The strain data may be in the form of a change in resistance and/or voltage in one or more of the respective strain gages 42, 44, which may indicate the relative, elastic deformation of each of the strain gages. In some embodiments, the strain circuitry 46 may include only a soldering pad for terminating the wires 48 from the strain gages 42, 44 to the output wire 49. In this embodiment, the majority of the computation of the resultant strains and forces may be performed in a separate system. In some alternative embodiments, as described herein, the strain circuitry 46 may process some or all of the strain data internally.

In some embodiments, the strain circuitry 46 supplies a current to each of the strain gages via wires 48 connecting each of the strain gages 42, 44 to the strain circuitry. The strain circuitry 46 may additionally or alternatively receive a voltage of each of the strain gages 42, 44 connected to the circuitry.

In some embodiments, as shown in FIG. 5, at least a portion of the wires 48 connecting one or more of the strain gages 42, 44 with the strain circuitry 46 may be disposed in channels in the edges 30 or surfaces 20, 21 of the safety belt anchor 5. At least a portion of the wires 48 may be entirely or partially disposed beneath the surface of the edges 30 of the anchor 5 to prevent interference from other components of the vehicle or from the passenger/cargo.

In some embodiments, as shown in FIGS. 3-4, the strain circuitry 46 may be positioned on the upper surface 20 of the safety belt anchor 5. In some further embodiments, the strain circuitry 46 may be recessed into the upper surface 20 of the safety belt anchor 5 so that all or a portion of the strain circuitry is below the surface 20 of the anchor. In some embodiments, the strain circuitry 46 may be positioned on the second end 22 of the surface 20 of the anchor 5. The strain circuitry 46 may be located between the first anchor opening 14 and the second anchor opening 10 relative to the axis C spanning the centers A, B of the first and second anchor openings 10, 14. The strain circuitry 46 may be directly between the two openings, on the axis C, or may be between the two openings relative to the axis C and offset from the axis, such as shown in FIGS. 3-5. In some alternative embodiments, the strain circuitry 46 may be positioned on the first end 24 of the top surface 24 of the anchor 5 either recessed beneath the safety belt path 50 (shown in FIG. 4) or to one side of the belt. In some alternative embodiments, the strain circuitry 46 may be recessed into the lower surface 21 (shown in FIG. 5) of the safety belt anchor 5.

In some embodiments, the strain circuitry 46 may be a strain processing circuitry. The strain processing circuitry 46 may process and combine the strain data to determine the force on the safety belt anchor 5. The strain processing circuitry 46 may then detect the resistance and/or voltage of each strain gage over time to determine the strain on the underlying safety belt anchor 5. The strain processing circuitry 46 may determine the force and output the resulting determination via a primary input/output cable 49. The strain processing circuitry 46 may include a microcontroller or other similar computing apparatus. In some other embodiments, the strain processing circuitry 46 may combine and output the resistance and/or voltage changes of the strain gages 42, 44 via the input/output cable 49 and the analysis and processing of the strain data may be performed in a separate computing system, such as a processor and memory located elsewhere in the vehicle. In some embodiments, the strain data may be sent from the strain processing circuitry 46 to a receiver outside the vehicle using an antenna or other communications interface known in the art.

In some embodiments, temperature compensation may be built in to the strain gage load cell 1 or may be added after the signal is output from the strain circuitry 46. For example, a temperature compensating resistor may be added to the strain circuit 46 in order to compensate for changes in the resistance of the strain gage caused by thermal expansion and the properties of the metal in the strain gage at different temperatures as well as the thermal expansion of the safety belt anchor 5. In some embodiments a dummy strain gage circuit may be added to the strain circuit 46, such as in a Wheatstone bridge configuration, to correct the strain data. In some alternative embodiments, the material of the strain gages 42, 44 may be chosen to automatically offset the effects of varying temperature on the strain gages 42, 44, such as by using a constantan alloy or Karma alloys. Temperature compensation may be particularly helpful in real world environments, and particularly in high-performance vehicles, where temperatures can vary over a large range during operation.

With reference to FIG. 4, a top-down view of a strain gage load cell anchor 1 is shown in accordance with some embodiments of the present invention. A safety belt 50 is looped around the first end of the safety belt anchor 5 through the first anchor opening 14. As discussed above, the anchor 5 may have a bend 18 disposed about the axis D to allow the second end 22 of the anchor to be attached flush with the vehicle while allowing the belt 50 to slide freely in the first anchor opening 14. A bolt 56 or other fastening member may be used to hold the anchor 5 onto the vehicle.

Figure 6:
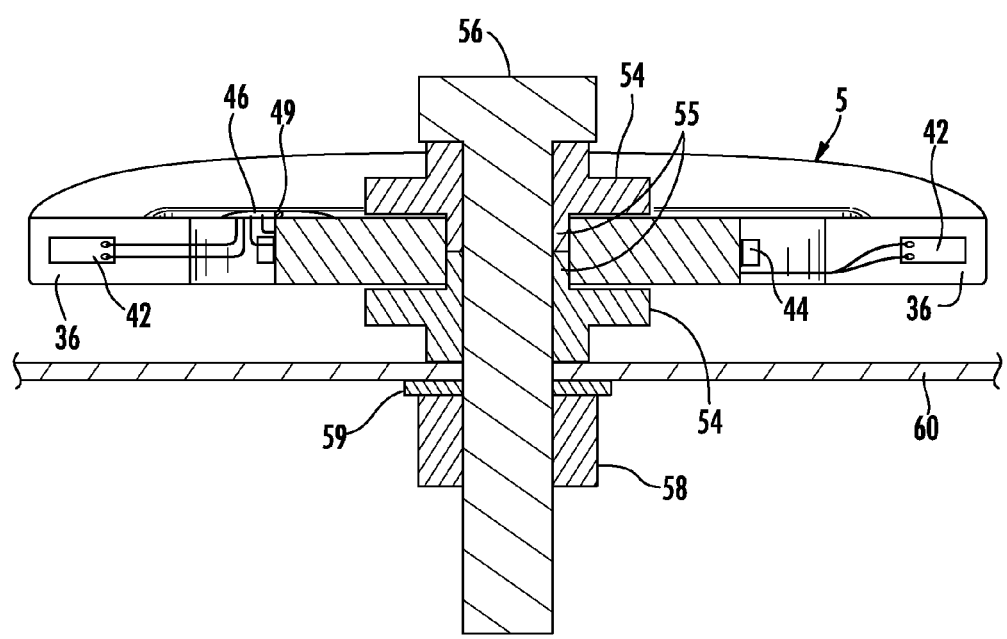
FIG. 6 shows a cutaway view of the strain gage load cell anchor attached to the vehicle as shown in FIG. 5.

With reference to FIGS. 5-6, in some embodiments, a pair of bushings 54 may be disposed on either side of the safety belt anchor 5 in order to allow the safety belt anchor to rotate about the bolt 54. In some embodiments, a bushing 54 may be located between the bolt 56 head and the safety belt anchor 5 and a bushing 54 may be disposed between the safety belt anchor 5 and a panel of the vehicle 60 (e.g., the side of a vehicle seat) to which the strain gage load cell anchor 1 is attached. In some embodiments, the bushings 54 may have a respective stand-off 55 on the anchor 5 side of the bushing. The stand-offs 55 may be configured to contact one another within the anchor 5 (e.g., as shown in FIG. 6) to allow the strain gage load cell anchor 1 to pivot. In some embodiments, the stand-offs may be configured to overlap one another, and in some other embodiments, the stand-offs may contact one another at respective ends.

In some embodiments, the combined length of the stand-offs 55 may be greater than the thickness of the safety belt anchor 5 such that only the stand-off 55 portion of one or both of the bushings 54 is in contact with the safety belt anchor 5. In some embodiments, the remainder of the bushings 54 may additionally or alternatively contact the outer surface of the safety belt anchor 5. In some embodiments, stand-offs may be used between the vehicle and the lower bushing 54.

The bushings 54 may provide a buffer between the bolt 56 and the safety belt anchor 5 and/or between the safety belt anchor and the vehicle 60 to reduce friction between the safety belt anchor and the vehicle and to allow the safety belt anchor to rotate. In some alternative embodiments, a washer or disc may be disposed between the safety belt anchor 5 and the vehicle 60 instead of or in addition to the lower bushing 54. In some alternative embodiments, the safety belt anchor 5 and the vehicle 60 may be flush. In some embodiments, a washer 59 or similar device may be used between the nut 58 and the vehicle 60 in order to distribute the load of the nut more evenly on the surface of the vehicle.

With reference to FIG. 6, a cutaway view of the strain gage load cell anchor 1 of FIG. 5 is shown. In FIG. 6, the stand-offs 55 of the bushings 54 are shown abutting at respective ends within the safety belt anchor. In the embodiment shown in FIG. 6, the stand-off sections are approximately the same length, within engineering tolerances. In some alternative embodiments, one of the stand-offs 55 may be longer than the other, or alternatively, one of the bushings 54 may have a stand-off that extends entirely through the safety belt anchor 5, while the other bushing has no stand-off. The internal diameter of the bushings 54 may be substantially the same as the outer diameter of the bolt 56, while still allowing tolerance for the bolt to be inserted into and/or removed from the bushings (e.g., a press or slip fit). In some embodiments, the outer diameter of the diameter of the stand-offs 55 may be substantially the same as the inner diameter of the second opening 10 of the safety belt anchor 5, while still allowing tolerance for the stand-offs to be inserted into and/or removed from the bushings (e.g., a press or slip fit).

In some embodiments of the present invention, coating materials may be used to protect some or all of the components of the strain gage load cell anchor 1 from damage. For example, in some embodiments, part or all of the edges 30 may be coated with a rubber, plastic, or similar substance to protect the wires 48, strain gages 42, 44, and/or strain circuitry 46 from damage and/or to insulate the components in order to prevent shorting. In some embodiments, the strain gage load cell anchor 1 may be dipped in coating material to protect large areas of the load cell anchor. In some other embodiments, as shown in FIGS. 3-5, the strain gages 42, 44 and/or strain circuitry 46 may be coated with a resilient material to protect and/or insulate the components.

Figure 7:
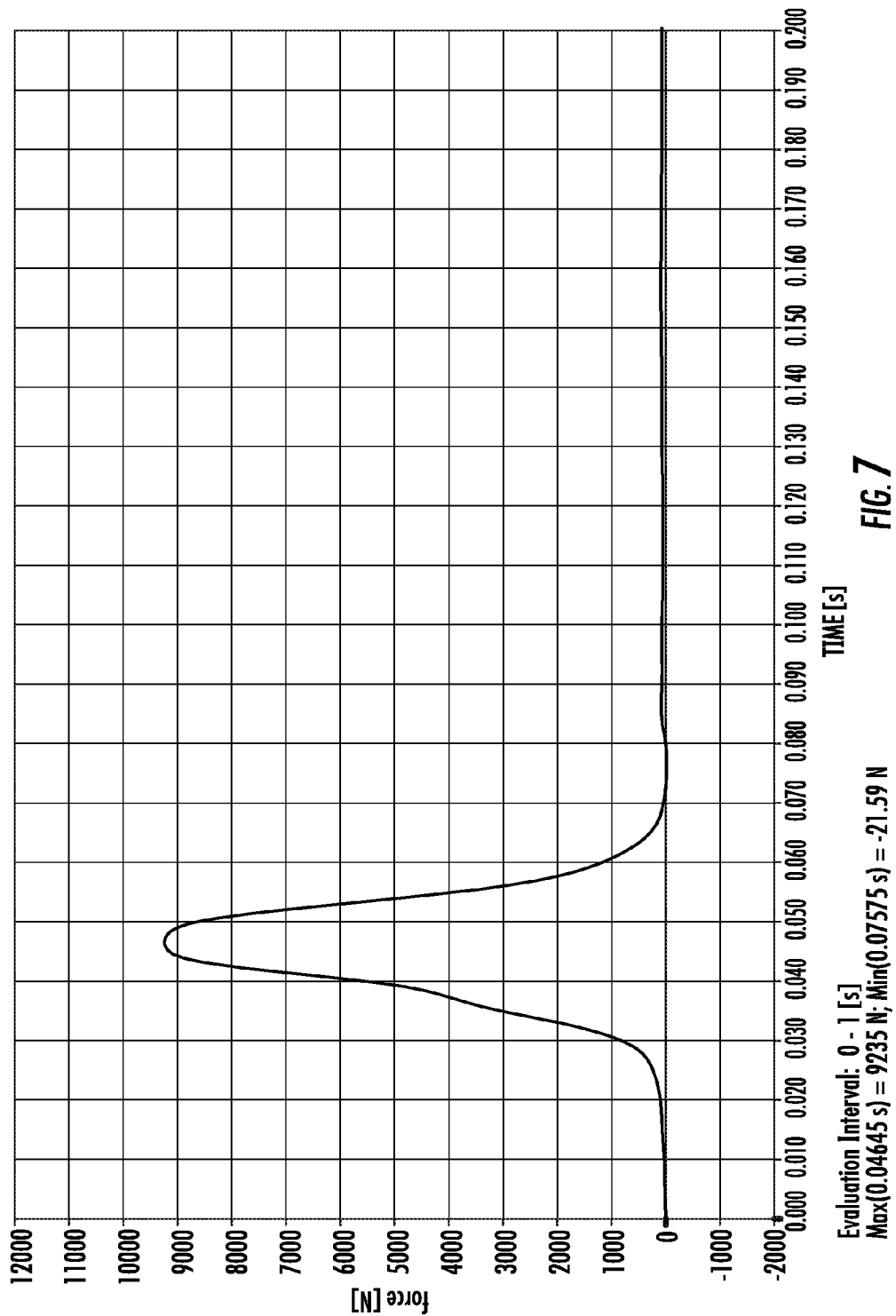
FIG. 7 illustrates an exemplary force vs. time plot based on data from an embodiment of the present invention.
Figure 8:
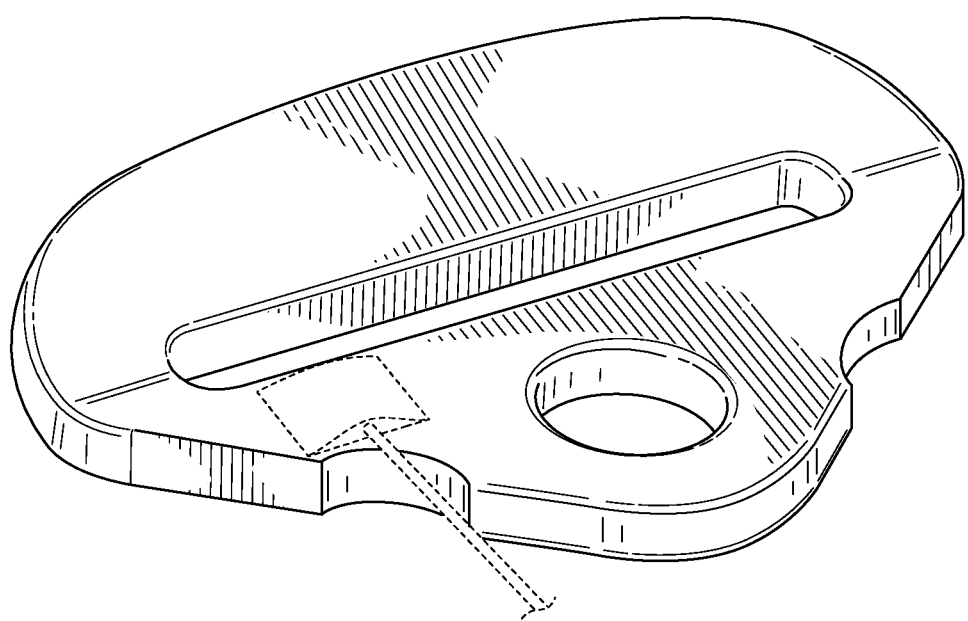
FIG. 8 shows a perspective view of a safety belt anchor in accordance with an embodiment of the present invention having the strain gages removed for exemplary purposes.
Figure 9:
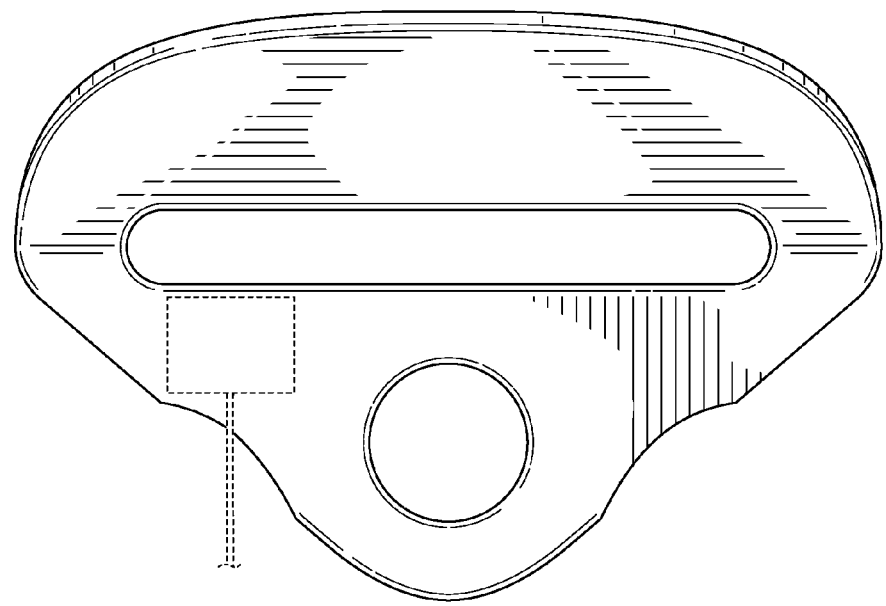
FIG. 9 a top view of a safety belt anchor in accordance with an embodiment of the present invention having the strain gages removed for exemplary purposes.
Figure 10:
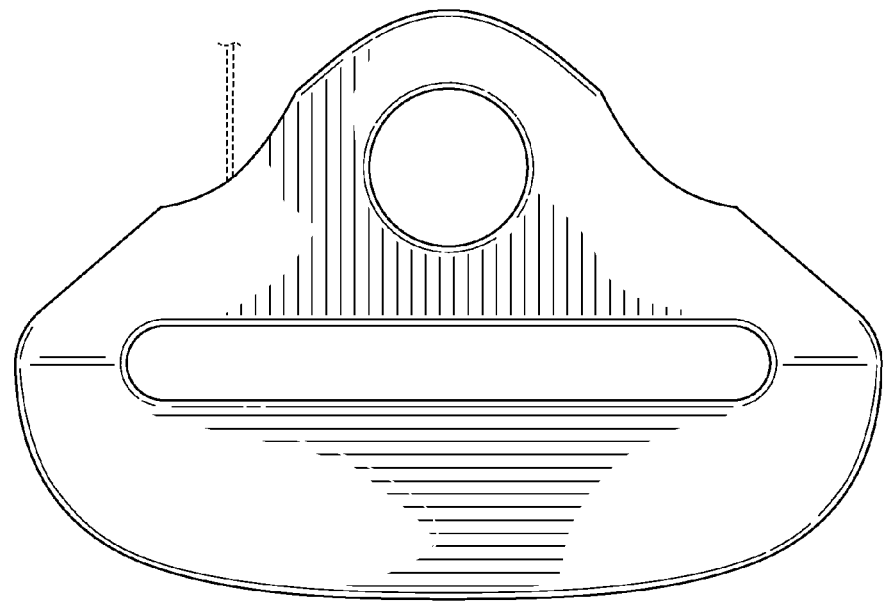
FIG. 10 shows a bottom view of a strain gage load cell anchor in accordance with an embodiment of the present invention having the strain gages removed for exemplary purposes.
Figure 11:
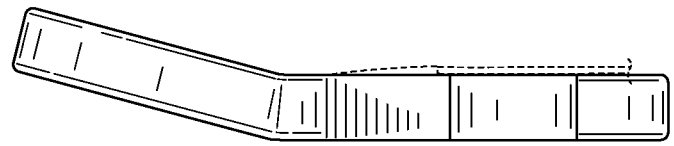
FIG. 11 shows a left side view of a strain gage load cell anchor in accordance with an embodiment of the present invention having the strain gages removed for exemplary purposes.
Figure 12:
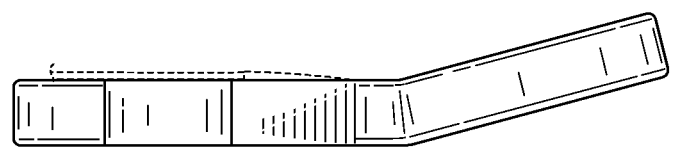
FIG. 12 shows a right side view of a strain gage load cell anchor in accordance with an embodiment of the present invention having the strain gages removed for exemplary purposes.
Figure 13:
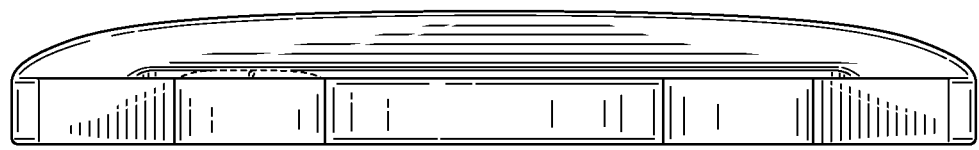
FIG. 13 shows a front view of a strain gage load cell anchor in accordance with an embodiment of the present invention having the strain gages removed for exemplary purposes.
Figure 14:
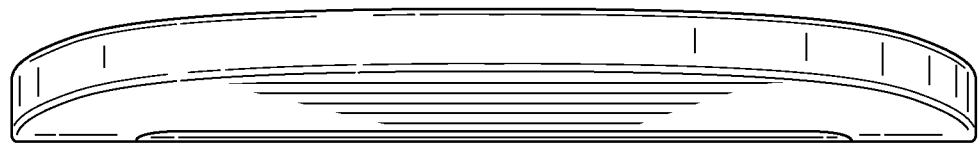
FIG. 14 shows a rear view of a strain gage load cell anchor in accordance with an embodiment of the present invention having the strain gages removed for exemplary purposes.

With reference to FIG. 7, example experimental results of the strain gage load cell 1 are shown. The plot in FIG. 7 shows an example force vs time curve for the left lap safety belt of a six point harness during a crash. In some embodiments, the raw data (e.g., in millivolts) from the strain gages 42, 44 may be transported via the cable 49 to an external processor, which may determine the force on the strain gage load cell anchor 1. In some other embodiments, the strain gage load cell anchor 1 may determine the force, or an intermediate step of the force, using the circuitry 46. The data obtained by embodiments of the present invention show low noise allowing improved force data in a smaller form factor than traditional load cells.

FIGS. 8-14 show respective perspective, top, bottom, left, right, front, and rear views of exemplary safety belt anchors 5 having the strain gages 42, 44 of the strain gage load cell anchors 1 removed. Additionally, FIGS. 8-14 show the strain circuitry 46 and cable 49 in dashed line.

The teachings described herein may not be limited to automobiles or vehicles generally. Strain gage load cell anchors, as taught herein, may likewise be applied to situations where tight space constraints or the need for constant monitoring require a small, reliable, customizable load cell that suits the particular application.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

What is claimed is:

1. A strain gage load cell anchor comprising:
    a safety belt anchor comprising:
        a first anchor opening configured to connect the safety belt anchor to a safety belt; and
        a second anchor opening configured to connect the safety belt anchor to a vehicle such that the safety belt anchor is configured to connect the safety belt to the vehicle; and
    one or more strain gages attached to the safety belt anchor, wherein the one or more strain gages are configured to measure a strain of the safety belt anchor caused by the safety belt, and wherein at least one of the one or more strain gages are attached to an edge of the safety belt anchor.

2. The strain gage load cell anchor of claim 1, wherein the safety belt anchor is configured to elastically deform at least between the first and second anchor openings in response to the force applied to the safety belt anchor; and
    wherein the one or more strain gages are configured to elastically deform when the safety belt anchor elastically deforms, and wherein a resistance of each strain gage is configured to change when elastically deformed, such that the one or more strain gages are configured to measure the force on the safety belt anchor via the change in resistance of each strain gage.

3. The strain gage load cell anchor of claim 1, wherein at least two of the strain gages are located on the same side of the first anchor opening as the second anchor opening.

4. The strain gage load cell anchor of claim 3, wherein the safety belt anchor further defines a first axis spanning between a center of the first anchor opening and a center of the second anchor opening, wherein at least two of the strain gages are located between the first and second anchor openings with respect to the first axis.

5. The strain gage load cell anchor of claim 1, wherein the safety belt anchor further defines a first axis spanning between a center of the first anchor opening and a center of the second anchor opening, and
    wherein the safety belt anchor further defines an axis of the second opening that is orthogonal to the first axis such that the safety belt anchor is configured to pivot about the axis of the second opening with respect to the vehicle to maintain a direction of the force within a plane defined by the first axis and the axis of the second opening.

6. The strain gage load cell anchor of claim 1, wherein the edge of the safety belt anchor defines a circumferential direction and a transverse direction substantially perpendicular to the circumferential direction; and
wherein the edge is flat in the transverse direction at a location of at least one of the one or more strain gages.

7. The strain gage load cell anchor of claim 1, further comprising at least one recess in the edge at a location of at least one of the one or more strain gages, such that the edge is concave in the circumferential direction at the location of the at least one of the one or more strain gages.

8. The strain gage load cell anchor of claim 1, wherein each of the one or more strain gages are attached to an edge of the safety belt anchor.

9. The strain gage load cell anchor of claim 1, further comprising at least one channel defined in an edge of the safety belt anchor;
wherein the edge defines a circumferential direction and a transverse direction substantially perpendicular to the circumferential direction;
wherein a transverse width of the at least one channel is less than a transverse width of the safety belt anchor; and
wherein at least one of the one or more strain gages is disposed within the at least one channel.

10. The strain gage load cell anchor of claim 1, wherein the safety belt anchor defines a first face and a second face;
wherein the first face is substantially parallel to the second face; and
wherein at least one of the one or more strain gages is attached to one of the first face or the second face.

11. The strain gage load cell anchor of claim 1, further comprising a strain circuitry disposed on the safety belt anchor and connected to each of the strain gages such that the strain circuitry is configured to receive strain data from each of the strain gages.

12. The strain gage load cell anchor of claim 11, wherein the strain circuitry is recessed into one of a first face or a second face defined by the safety belt anchor.

13. The strain gage load cell anchor of claim 11, wherein the strain circuitry is connected to each of the strain gages by one or more respective wires, and wherein at least one of the wires is at least partially disposed in a wire channel defined in an edge of the safety belt anchor.

14. The strain gage load cell anchor of claim 11, wherein the strain circuitry further comprises a temperature compensator configured to isolate strain data from temperature fluctuations within a predefined range.

15. The strain gage load cell anchor of claim 11, wherein the strain circuitry comprises a strain processing circuitry configured to determine one of a force or strain on the safety belt anchor.

16. A method of manufacturing a strain gage load cell, the method comprising:
providing a safety belt anchor having a first anchor opening and a second anchor opening; wherein the first anchor opening is configured to connect the safety belt anchor to a safety belt; wherein the second anchor opening is configured to connect the safety belt anchor to a vehicle such that the safety belt anchor is configured to connect the safety belt to the vehicle; and
attaching one or more strain gages to the safety belt anchor such that the one or more strain gages are configured to measure the force on a strain of the safety belt anchor, wherein attaching the one or more strain gages comprises attaching the one or more strain gages to an edge of the safety belt anchor.

17. The method of claim 16, wherein the safety belt anchor further defines a first axis spanning between a center of the first anchor opening and a center of the second anchor opening, and
wherein the safety belt anchor further defines an axis of the second opening that is orthogonal to the first axis such that the safety belt anchor is configured to pivot about the axis of the second opening with respect to the vehicle to maintain a direction of the force within a plane defined by the first axis and the axis of the second opening.

18. The method of claim 16, further comprising flattening the edge of the safety belt anchor at a location of attachment for at least one of the one or more strain gages.

19. The method of claim 16, further comprising forming at least one recess in the edge adjacent at least one of the one or more strain gages;
wherein the edge of the safety belt anchor defines a circumferential direction and a transverse direction substantially perpendicular to the circumferential direction; and
wherein the edge is concave in the circumferential direction adjacent the at least one of the one or more strain gages.

20. The method of claim 16, further comprising
attaching a strain circuitry to the safety belt anchor; and
connecting the strain circuitry to each of the strain gages such that the strain circuitry is configured to receive strain data from each of the strain gages.

21. A method of measuring a force strain on a load cell anchor, wherein the load cell anchor comprises a safety belt anchor having a first anchor opening and a second anchor opening, wherein a safety belt is connected to the first anchor opening, wherein the second anchor opening is connected to a vehicle such that the safety belt is connected to the vehicle via the safety belt anchor, wherein the load cell anchor further includes one or more strain gages attached to the safety belt anchor, and wherein at least one of the one or more strain gages are attached to an edge of the safety belt anchor, the method comprising:
applying force to the safety belt anchor by the safety belt; and
measuring the strain of the safety belt anchor with the one or more strain gages attached to the safety belt anchor.

22. The method of claim 21, wherein applying the force to the safety belt anchor causes the safety belt anchor to elastically deform such that the one or more strain gages also elastically deform; and
wherein measuring the force applied to the safety belt anchor comprises measuring the change in voltage in the one or more strain gages caused by the elastic deformation of the one or more strain gages.

23. The method of claim 21, wherein measuring the force applied to the safety belt anchor further comprises receiving strain data from the one or more strain gages with a strain circuitry.

24. The method of claim 23, wherein receiving strain data from the one or more strain gages with the strain circuitry further comprises applying a temperature compensation to the strain data.

25. The method of claim 21, wherein the strain circuitry comprises a strain processing circuitry, and wherein measuring the force applied to the safety belt anchor further comprises determining one of a force or strain on the safety belt anchor using the strain processing circuitry.

26. The strain gage load cell anchor of claim 1, wherein the at least one of the one or more strain gages are attached to an outer edge of the safety belt anchor.

27. The method of claim 16, wherein attaching the one or more strain gages comprises attaching the one or more strain gages to an outer edge of the safety belt anchor.

28. The method of claim 21, wherein the at least one of the one or more strain gages are attached to an outer edge of the safety belt anchor.

* * * * *

UNITED STATES PATENT AND TRADEMARK OFFICE
CERTIFICATE OF CORRECTION

PATENT NO. : 9,580,042 B2  
APPLICATION NO. : 14/327150  
DATED : February 28, 2017  
INVENTOR(S) : Patalak et al.

Page 1 of 1

It is certified that error appears in the above-identified patent and that said Letters Patent is hereby corrected as shown below:

In the Claims

Column 14:
Line 3, "the force on a strain of" should read --a strain of--;
Line 37, "a force strain" should read --a strain--;
Line 48, "applying force" should read --applying a force--.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*